United States Patent
Nambiar et al.

(10) Patent No.: US 8,145,684 B2
(45) Date of Patent: *Mar. 27, 2012

(54) SYSTEM AND COMPUTER PROGRAM PRODUCT FOR ASSEMBLY OF PERSONALIZED ENTERPRISE INFORMATION INTEGRATORS OVER CONJUNCTIVE QUERIES

(75) Inventors: Ullas B. Nambiar, New Delhi (IN); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/946,172

(22) Filed: Nov. 28, 2007

(65) Prior Publication Data

US 2009/0138431 A1    May 28, 2009

(51) Int. Cl.
   *G06F 17/30* (2006.01)
(52) U.S. Cl. .............. 707/804; 707/805; 707/705
(58) Field of Classification Search ............. 707/200, 707/999.2, 803, 705, 804, 805
   See application file for complete search history.

(56) References Cited

U.S. PATENT DOCUMENTS

| | | | | |
|---|---|---|---|---|
| 5,600,831 A | * | 2/1997 | Levy et al. | 707/2 |
| 5,701,460 A | * | 12/1997 | Kaplan et al. | 707/748 |
| 5,768,578 A | * | 6/1998 | Kirk et al. | 707/100 |
| 5,995,961 A | * | 11/1999 | Levy et al. | 707/4 |
| 6,567,802 B1 | | 5/2003 | Popa et al. | |
| 6,957,214 B2 | | 10/2005 | Silberberg et al. | |
| 7,092,958 B2 | * | 8/2006 | Hempstead et al. | 707/102 |
| 7,269,604 B2 | * | 9/2007 | Moore et al. | 1/1 |
| 7,308,646 B1 | * | 12/2007 | Cohen et al. | 715/236 |
| 7,310,646 B2 | * | 12/2007 | Rangadass et al. | 1/1 |
| 7,363,299 B2 | | 4/2008 | Dalvi et al. | |
| 7,464,083 B2 | | 12/2008 | Otter et al. | |
| 7,493,311 B1 | * | 2/2009 | Cutsinger et al. | 707/3 |
| 7,533,107 B2 | * | 5/2009 | Gupta et al. | 707/101 |
| 7,580,946 B2 | | 8/2009 | Mansour et al. | |
| 7,620,615 B1 | * | 11/2009 | Milby | 707/2 |
| 7,668,798 B2 | * | 2/2010 | Scanlon et al. | 1/1 |
| 7,734,606 B2 | * | 6/2010 | Walker | 707/705 |
| 2001/0013035 A1 | * | 8/2001 | Cohen | 707/5 |

(Continued)

FOREIGN PATENT DOCUMENTS

WO    WO2007059034 A1    5/2007

(Continued)

OTHER PUBLICATIONS

Garcia-Molina et al., "Integrating and Accessing Heterogeneous Information Sources in TSIMMIS", 1995, pp. 1-4, accessed online at <http://coast.cise.ufl.edu/~jhammer/publications/AAAI1995/tsimmis-abstract-aaai.pdf> on Jan. 12, 2010.*

(Continued)

*Primary Examiner* — Hung T Vy
*Assistant Examiner* — Phuong Thao Cao
(74) *Attorney, Agent, or Firm* — Ryan, Mason & Lewis, LLP

(57) ABSTRACT

A plurality of sources are registered. A plurality of schemas are constructed, based on the plurality of sources. A desired output is obtained as a conjunctive query. A list of potential connections between at least selected ones of the sources is provided. A plurality of join plans are developed, based on the connections.

12 Claims, 7 Drawing Sheets

U.S. PATENT DOCUMENTS

| | | | |
|---|---|---|---|
| 2002/0023091 A1* | 2/2002 | Silberberg et al. | 707/103 Y |
| 2002/0161748 A1* | 10/2002 | Hamel et al. | 707/3 |
| 2003/0172368 A1* | 9/2003 | Alumbaugh et al. | 717/106 |
| 2003/0217069 A1* | 11/2003 | Fagin et al. | 707/102 |
| 2004/0034651 A1* | 2/2004 | Gupta et al. | 707/102 |
| 2004/0128276 A1* | 7/2004 | Scanlon et al. | 707/1 |
| 2004/0133543 A1* | 7/2004 | Shlaes et al. | 707/1 |
| 2004/0181543 A1* | 9/2004 | Wu et al. | 707/102 |
| 2004/0186826 A1* | 9/2004 | Choi et al. | 707/3 |
| 2004/0260715 A1* | 12/2004 | Mongeon et al. | 707/101 |
| 2005/0015439 A1* | 1/2005 | Balaji et al. | 709/203 |
| 2005/0055369 A1* | 3/2005 | Gorelik et al. | 707/102 |
| 2005/0060647 A1* | 3/2005 | Doan et al. | 715/514 |
| 2005/0165752 A1 | 7/2005 | Matthew et al. | |
| 2005/0165817 A1* | 7/2005 | O'Conor | 707/101 |
| 2006/0036463 A1 | 2/2006 | Patrick et al. | |
| 2006/0047721 A1* | 3/2006 | Narang et al. | 707/204 |
| 2006/0136452 A1* | 6/2006 | Lim et al. | 707/101 |
| 2006/0167856 A1* | 7/2006 | Angele et al. | 707/3 |
| 2006/0167865 A1* | 7/2006 | Andrei | 707/4 |
| 2006/0248045 A1 | 11/2006 | Toledano et al. | |
| 2006/0265352 A1* | 11/2006 | Chen et al. | 707/2 |
| 2006/0271528 A1* | 11/2006 | Gorelik | 707/3 |
| 2006/0271563 A1 | 11/2006 | Angelo et al. | |
| 2007/0016596 A1* | 1/2007 | Fabret et al. | 707/100 |
| 2007/0055647 A1* | 3/2007 | Mullins et al. | 707/2 |
| 2007/0067274 A1 | 3/2007 | Han et al. | |
| 2007/0106629 A1 | 5/2007 | Endacott et al. | |
| 2007/0203893 A1 | 8/2007 | Krinsky et al. | |
| 2007/0240172 A1* | 10/2007 | Banker et al. | 719/328 |
| 2007/0255741 A1* | 11/2007 | Geiger et al. | 707/101 |
| 2008/0027830 A1* | 1/2008 | Johnson et al. | 705/27 |
| 2008/0082569 A1* | 4/2008 | Mansour et al. | 707/102 |
| 2008/0120283 A1 | 5/2008 | Liu et al. | |
| 2008/0139179 A1* | 6/2008 | Christy et al. | 455/414.1 |
| 2008/0147627 A1 | 6/2008 | Natkovich et al. | |
| 2008/0249981 A1 | 10/2008 | Norring et al. | |
| 2008/0313162 A1 | 12/2008 | Bahrami et al. | |
| 2009/0012983 A1* | 1/2009 | Senneville et al. | 707/101 |

FOREIGN PATENT DOCUMENTS

| | | |
|---|---|---|
| WO | WO2007075155 | 7/2007 |
| WO | WO2007081666 A2 | 7/2007 |
| WO | WO2007089264 A2 | 8/2007 |

OTHER PUBLICATIONS

Naidu et al, "On-The-Fly data Integration Models for Biological Databases", Symposium on Applied Computing, 2007, pp. 118-122, accessed online at <http://portal.acm.org/citation.cfm?id=1244031> on Jan. 12, 2010.*

Haas et al., "Data Integration through database federation", IBM Systems Journal, vol. 41, No. 4, 2002, pp. 578-596, accessed online at <http://iwayan.info/Research/Interoperability/Papers_Research/Federated/haas_PRN.pdf> on Jan. 12, 2010.*

Haas et al., "DiscoveryLink: A system for integrated access to life science data sources", IBM Systems Journal, vol. 40, No. 2, 2001, pp. 489-511.*

Halevy et al., "Enterprise Information Integration: Successes, Challenges and Controversies", SIGACM-SIGMOD' 05, 2005, Baltimore, Maryland USA, 10 pages, accessed online at <http://www.cs.washington.edu/homes/alon/files/eiisigmod05.pdf> on Oct. 27, 2011.*

The Gilbane Report, "What is Enterprise Information Integration (EII)?", vol. 12, No. 6, 2004, pp. 1-7, accessed online at <http://gilbane.com/artpdf/GR12.6.pdf> on Oct. 27, 2011.*

"Enterprise Information Integration: A New Definition", Information Management Online, Sep. 2, 2004, 4 pages, accessed online at <http://www.information-management.com/news/1009669-1.html?zkPrintable=true> on Oct. 27, 2011.*

Dong, X. et al. "A Platform for Personal Information Management" CIDR 2005.

Shen, W. "Source-aware Entity Matching: A Compositional Approach." ICDE 2007.

Sayyadian, M. et al "Efficient Keyword Search Across Heterogeneous Relational Databases." ICDE 2007.

Yee, L et al "A Virtual Reality Interface to an Enterprise Metadatabase" 16th International Conference on Conceptual Modeling—ER '97 Proceedings, 1997, pp. 436-449.

* cited by examiner

ENTERPRISE INTEGRATION TODAY

SCHEMA REGISTRATION AND BUILDING

FIG. 3
FILTERING JOINS AND BUILDING JOIN PLANS

210 — SCHEMA BUILDING - FILTERING JOINS
- BUDGET ↔ SALARY ✗
- BUDGET ↔ EXPECTED_SALARY ✗
- SALARY ↔ EXPECTED_SALARY ✗
- SKILL ↔ EXPERTISE
- SKILL ↔ SKILL_SET
- SKILL_SET ↔ EXPERTISE ✗
- PR_LOCATION ↔ LOCATION_PREFERENCE
- PR_LOCATION ↔ EMP_LOCATION
- EMP_LOCATION ↔ LOCATION_PREFERENCE ✗
- ALLOCATED_EMPS ↔ EName
- ALLOCATED_EMPS ↔ ApName ✗

312 — SCHEMA BUILDING - SUGGESTED JOIN PLANS
- SCHEMA 1:- PROJECTS, EMPLOYEE
  WHERE SKILL = EXPERTISE, PR_LOCATION = EMP_LOCATION

- SCHEMA 2:- PROJECTS, APPLICANTS
  WHERE SKILL = SKILL_SET,
  PR_LOCATION = LOCATION_PREFERENCE

- SCHEMA 3:- PROJECTS, EMPLOYEE, APPLICANTS
  WHERE SKILL = EXPERTISE OR SKILL = SKILL_SET,
  PR_LOCATION = EMP_LOCATION OR
  PR_LOCATION = LOCATION_PREFERENCE  ✓

314 — SELECT * FROM SCHEMA 3 WHERE SKILL = "JAVA"

ANYTIME INTEGRATION FRAMEWORK

- USER'S SCHEMA IS MAPPED TO SOURCE SCHEMA
- GLOBAL SCHEMA (OPTIONAL) IS SEEN AS A LIBRARY INSIDE THE SCHEMA BUILDER

ANYTIME ASSEMBLY OF PERSONALIZED EII SYSTEM

SYSTEM AND COMPUTER PROGRAM PRODUCT FOR ASSEMBLY OF PERSONALIZED ENTERPRISE INFORMATION INTEGRATORS OVER CONJUNCTIVE QUERIES

CROSS-REFERENCE TO RELATED APPLICATION(S)

The present application is related to a commonly assigned U.S. application entitled "Method For Assembly Of Personalized Enterprise Information Integrators Over Conjunctive Queries," U.S. Ser. No. 11/946,130, filed on Nov. 28, 2007, the disclosure of which is incorporated by reference herein in its entirety.

FIELD OF THE INVENTION

The present invention relates to the electrical, electronic and computer arts, and, more particularly, to enterprise information integration (EII) systems and the like.

BACKGROUND OF THE INVENTION

Current EII systems are generally aimed at scenarios with a large user base. These systems are often complex, and may require manual reconciliation of schemas. With current systems, the large demand typically justifies the relatively large costs involved. End-users of current systems usually expect precise answers for their queries. The SEMEX System, as discussed in X. Dong and A. Halevy, A Platform for Personal Information Management and Integration, CIDR 2005, offers users a flexible platform for personal information management by creating associations between data items on the users' desktop. However, SEMEX can only support building of integration systems for sources residing on the user's workstation. This implicitly makes the user "an expert" and also the "admin" for all the sources to be integrated. The solution is not appropriate when the user wants to combine sources operated by other users and accessible remotely.

The references (i) W. Shen, P. DeRose, L. Vu, A, Doan, R. Ramakrishnan, Source-aware Entity Matching: A Compositional Approach, ICDE 2007, and (ii) M. Sayyadian, H. LeKhac, A. Doan, L. Gravano, Efficient Keyword Search across Heterogeneous Relational Databases, ICDE 2007 support relational databases and do not provide support for quickly setting up a personalized mediator over autonomous sources.

FIG. 1 shows a prior-art EII system 100. User 102 seeks to find employees with four years experience in the Java programming language. User 102 accesses global schema 104 which in turn accesses a plurality of source schemas 106, 108, and 110. Each of these in turn accesses a database 112, 114, 116 through a corresponding wrapper 118, 120, 122. The original motivation for system 100 may be, for example, an enterprise application, such as payroll, human resources, banking, and the like. Such systems typically require "Precise Integration," target a large user base with long-term needs, and are time consuming and costly to build and maintain.

SUMMARY OF THE INVENTION

Principles of the present invention provide techniques for assembly of personalized enterprise information integrators over conjunctive queries. In one aspect, an exemplary method (which can be computer implemented) for assembly of personalized enterprise information integrators over conjunctive queries, includes the steps of registering a plurality of sources; constructing a plurality of schemas based on the plurality of sources; and obtaining a desired output as a conjunctive query. The method further includes providing a list of potential connections between at least selected ones of the sources; and developing a plurality of join plans based on the connections.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention may offer one or more technical benefits; for example, an infrastructure that proactively helps an enterprise user in assembling an information integration system for answering queries that only the user may want to ask. One or more embodiments of the invention can be used in building and updating models of shared understanding, called Ontologies, as the information technology (IT) system evolves with time. One or more embodiments of the invention can also be used to detect emergent behavior in IT systems, and this also leads to better intelligence for enterprises.

These and other features, aspects and advantages of the present invention will become apparent front the following detailed description of illustrative embodiments thereof, which is to be read in connection with the accompanying drawings.

BRIEF DESCRIPTION OF THE DRAWINGS

FIG. 3 depicts exemplary filtering joins and building join plans according to an aspect of the invention;

DETAILED DESCRIPTION OF PREFERRED EMBODIMENTS

On-the-fly information integration refers to lightweight data management tasks that require combining information from multiple sources to achieve a task. One or more embodiments of the invention enable the non-technical users in an enterprise to easily integrate diverse sources, in some instances, even for transient tasks. Given a high level information need—specified as a conjunctive query suggesting a "desired output," one or more embodiments of the invention help the user in quickly identifying the sources in the enterprise that can together answer the query. Further, one or more instances of the invention will help the user by suggesting possible associations between the various chosen datasets, and will enable users to easily incorporate new data sources into the database using an inventive source registration step, discussed below. One or more aspects of the invention also help in priming up the dataset for integration with other (tobe) registered sources. Thus, various instances or aspects of the invention enable a user to quickly build an integrator to find answers to (often personal) information needs from enterprise-wide data sources.

One or more embodiments of the invention provide a novel framework for building personalized mediation systems for answering conjunctive queries using enterprise-wide sources and services. Instances of the inventive domain-independent framework support publishing Source Information (data and services) without knowing the complete global model, e.g., schema models. A "desired output" model is then accepted and an integration scheme is suggested. Techniques are provided to recommend mapping between source schema and global schema to publisher. Additional techniques provide easy information extraction from the integration scheme, support keyword searches over the personalized integration scheme, provide ranked results and explanations, and/or automatically gather cost-metrics and performance statistics.

In another aspect, a domain independent method is provided for mapping data sources that have been registered by different users, without the presence of a single global schema. The mappings may be identified, for example, using syntactic matching techniques or derived from past linkage models in turn derived from integration systems built by other users. Once the mappings are approved by the user, one or more embodiments of the invention will then suggest various possible plans for combining the information from the sources along with a cost based ranking of such plans. The user can pick an appropriate plan, and preferably, the best plan, to set up the personalized integration system and then issue conjunctive queries over the system. One or more inventive techniques can be easily extended to support a variety of querying formats and languages, including keyword search and support for ranked answers for queries issued by the users.

Figure 1:
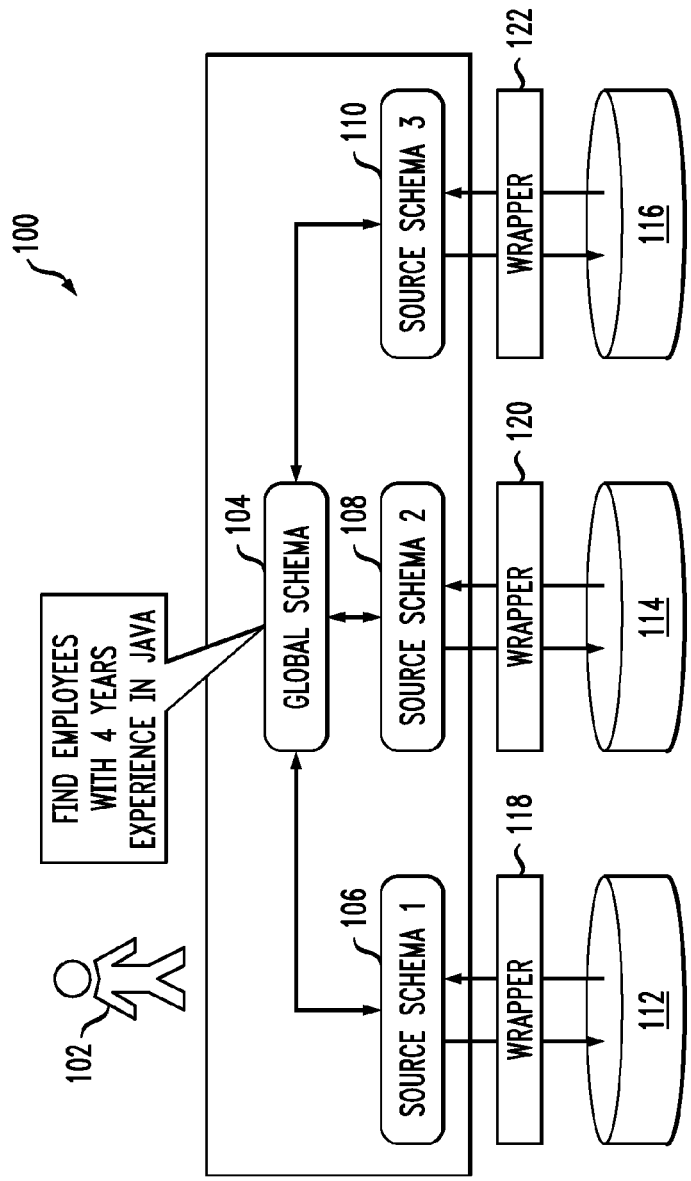
FIG. 1 depicts enterprise integration according to the prior art.
Figure 2:
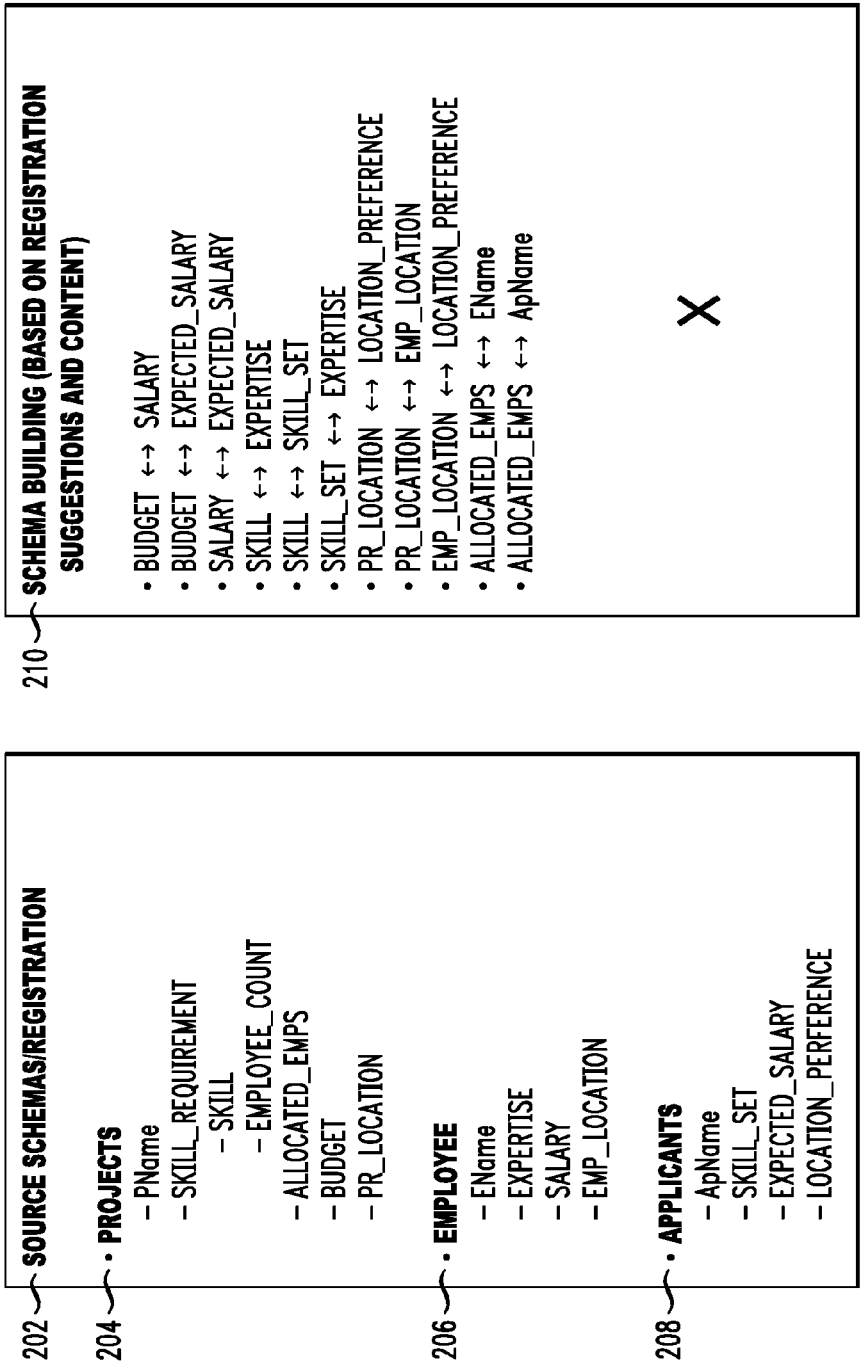
FIG. 2 depicts exemplary schema registration and building according to an aspect of the invention.

Aspects of the invention will be illustrated using a non-limiting example. Consider a mid-level Project Manager who is interested in identifying the average cost of setting up a new 10 member team for developing a custom software application. Also, he or she would like to identify potential team members and their availability. It will be appreciated that this example is one which addresses satisfaction of an immediate need, of interest to a single user or a very small subset of users. The user may well be ready to trade completeness for speed and lower cost. With reference to FIG. 2, in terms of sources 202, cost metrics for various stages of the project can be estimated by querying a projects database 204. Team member identification can be done using an employee profile database 206 and also a new applicant database 208.

The skilled artisan is familiar with the basics of databases. A database is a repository of data whose structure is explicitly defined in a standardized representation called a schema. All data instances in the database would conform to the defined schema of the database. Data can be stored outside databases also, like on a file system. In this case, the structure is unknown up-front, and such data is called unstructured data. Data can be also represented in semi-structured format like extensible mark-up language (XML) where its structure is not restricted up-front but can be automatically extracted out by the syntax in which the data is stored. One or more embodiments of the invention address data in one, some, and/or all of the three forms.

In terms of constraints, there will likely be many sources with varying schemas. The need being immediate, and not generic enough, makes it infeasible to build a system to integrate the sources from scratch. Even assuming the sources have easily reconcilable schema, the project manager may not have time and the necessary expertise to integrate the sources. Schema building, based on registration suggestions and content, is shown at 210, is discussed in greater detail below.

It should be noted that information sources may be partially or completely autonomous. The number of sources is typically in the hundreds. There may be structured sources, e.g., relational databases (used by EII systems); semi-structured sources, e.g. spreadsheets, emails, web pages, web logs ("blogs"), and the like; and unstructured sources, e.g. reports, publications, manuals and so on. The source schema and content may change, and sources may enter and/or leave the integration environment FIG. 3 shows the schema building aspect 210 of FIG. 2, wherein joins have been filtered, as indicated by the "X" notation next to certain entries. As shown at 312, there are three suggested join plans in this instance, namely. Schema 1, Schema 2, and Schema 3. A possible query from Schema 3 is shown at block 314.

Figure 4:
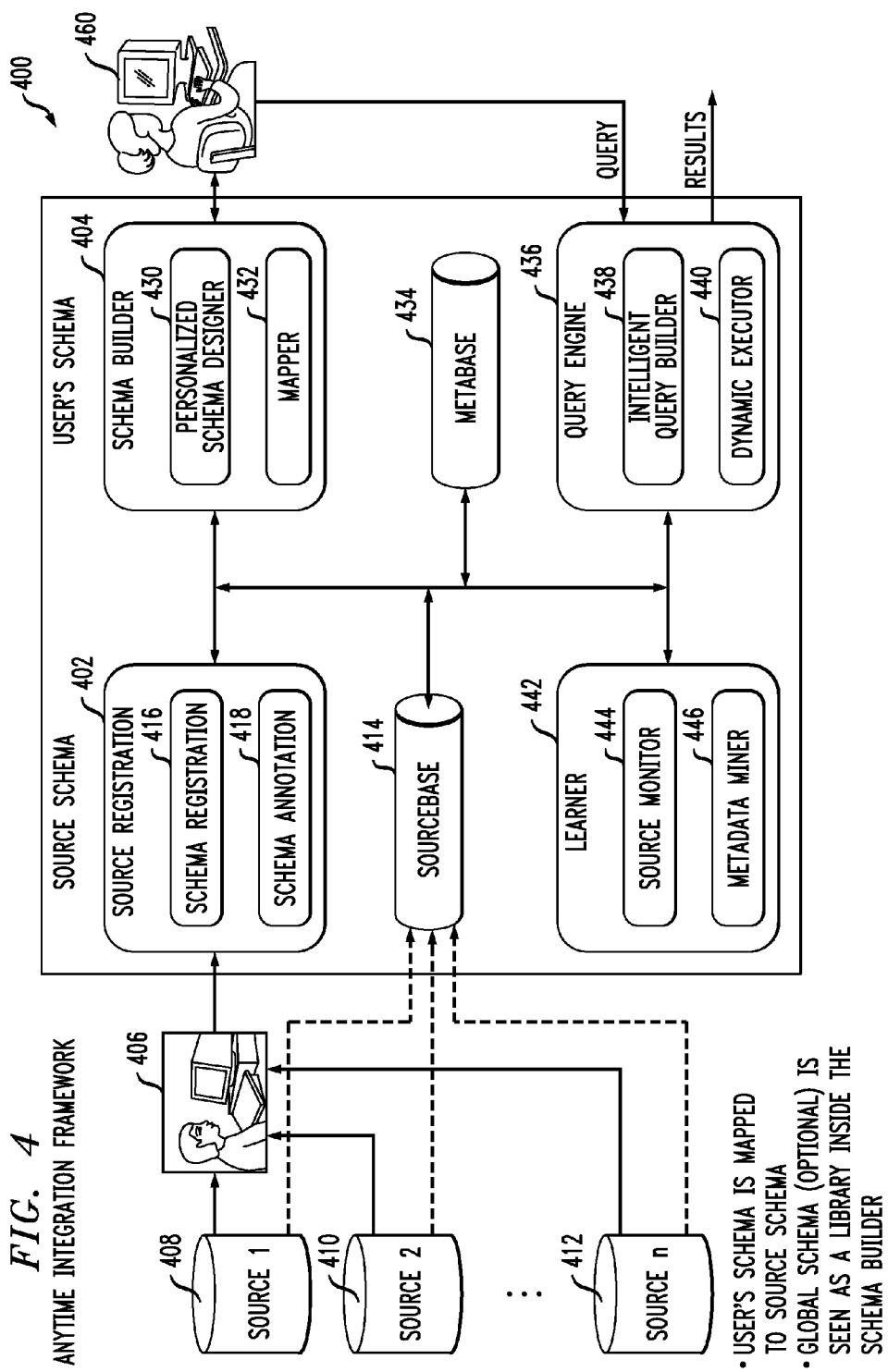
FIG. 4 depicts an exemplary inventive integration framework.
Figure 5:
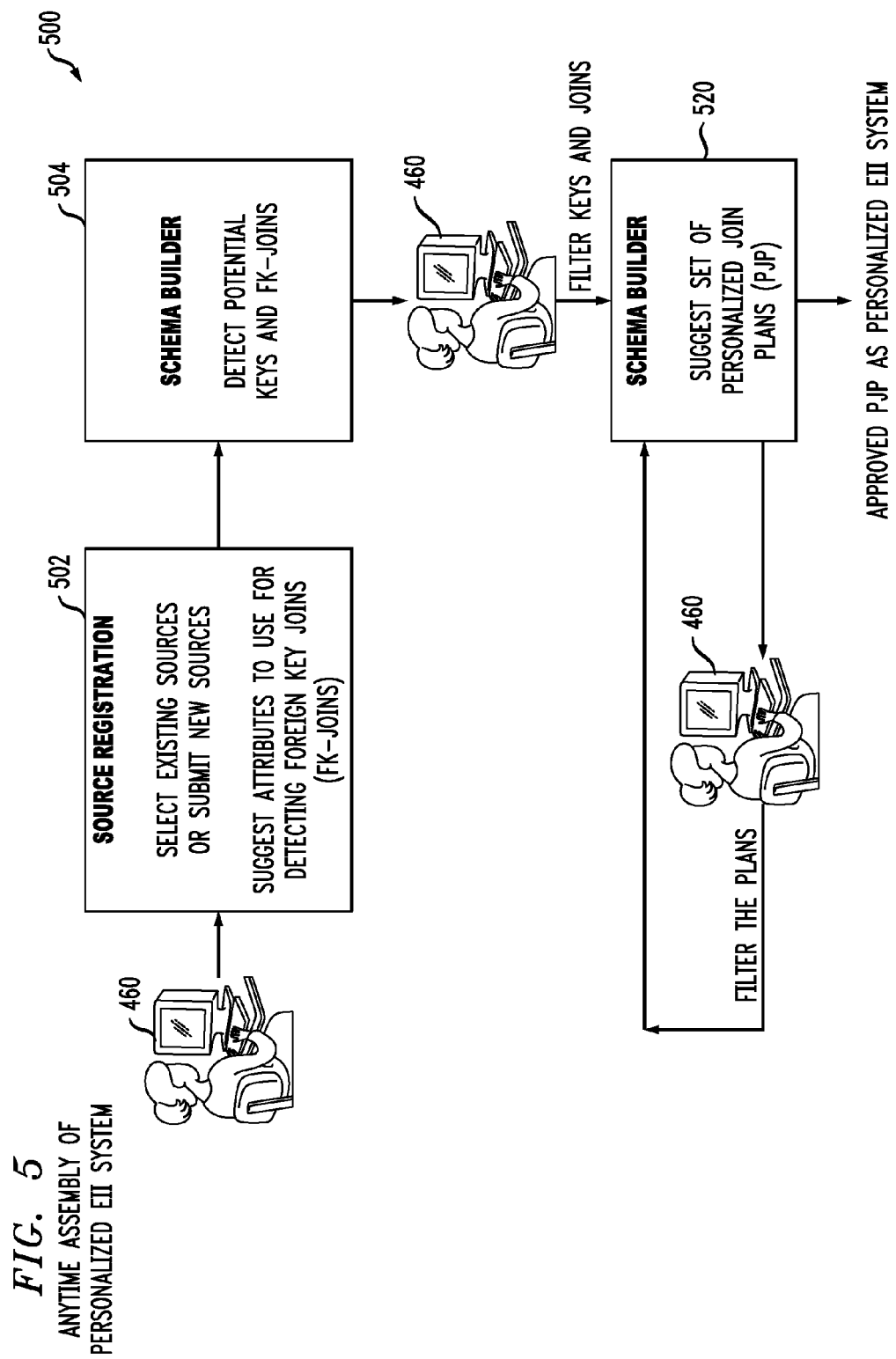
FIG. 5 is a flow chart showing exemplary assembly of a personalized EII system, according to an aspect of the invention.

Attention should now be given to FIG. 4, depicting exemplary framework 400, and to flow chart 500 of FIG. 5. Initially, a step of source registration and schema building is carried out, as per blocks 402 and 404 in FIG. 4 and steps 502 and 504 in FIG. 5. The user 406 can register the source (such as 408, 410, or 412) by providing an access path and then selecting the schema to publish. The various elements (attributes) in the schema can be enhanced by providing metadata such as the type of attribute, a sample instance, etc. Providing such information will help the framework in finding potential combinations. This step is optional if the user has no new source to contribute. Registered sources can be stored in sourcebase 414. Source registration block 402 may carry out both registration and annotation functions, as indicated, at blocks 416, 418.

One exemplary inventive approach to iteratively building a "Desired Output" based personalized enterprise information integrator will now be set forth. The user 460 provides a "desired output" to the system in the form of a "conjunctive query". For illustrative purposes, the exemplary embodiment employs a simple syntax for such a query, like the widely accepted SQL. Given the high level goal, potential sources that can be used to answer such a query are identified. The user 460 can optionally add and/or remove sources to the identified list. Once the sources are accepted by the user, using schema matching techniques along with information from the plan libraries, a list of potential connections (joins) between the sources is provided. The user can filter out the connections if need be and then proceed towards a join plan creation at step 520. The system can then automatically generate various join plans and use statistical information about the sources to provide cost metrics for each such plan. The user 460 can pick the best plan as per his understanding which will then be registered as the schema for the user's personalized information integrator. The user 406 can be same as the user 460; however, in a general case, he may be a totally different user who just decided to register the source. Hence, FIG. 4 shows a different user icon 406 to represent a separate user from user 460.

Schema builder 404 can include a personalized schema designer 430 and a mapper 432. Thus, builder 404 accesses the source schema and selects appropriate users' schema for the user 460. The metadata mentioned elsewhere herein can be contained in metabase 434. The user's query can be provided to query engine 436, including intelligent query builder 438 and dynamic executor 440. Engine 436 outputs the results as shown. Learner 442 includes source monitor 444 and metadata miner 446, and may be accessed by query engine 436 when processing queries to obtain results.

The details of functionality for source registration 402 and for the schema builder 404 are shown in FIGS. 2 and 3. The query engine 436 allows users to query over the personalized mediator. The query could be, for example, in SQL or just keywords, and these will be converted into the necessary format by the intelligent query builder 438. The dynamic executor will use the source statistics provided by the learner 442 to schedule execution of the query. This involves ordering the call sequence of the sources, eliminating duplicates and creating the final output to be sent to the user.

Figure 6:
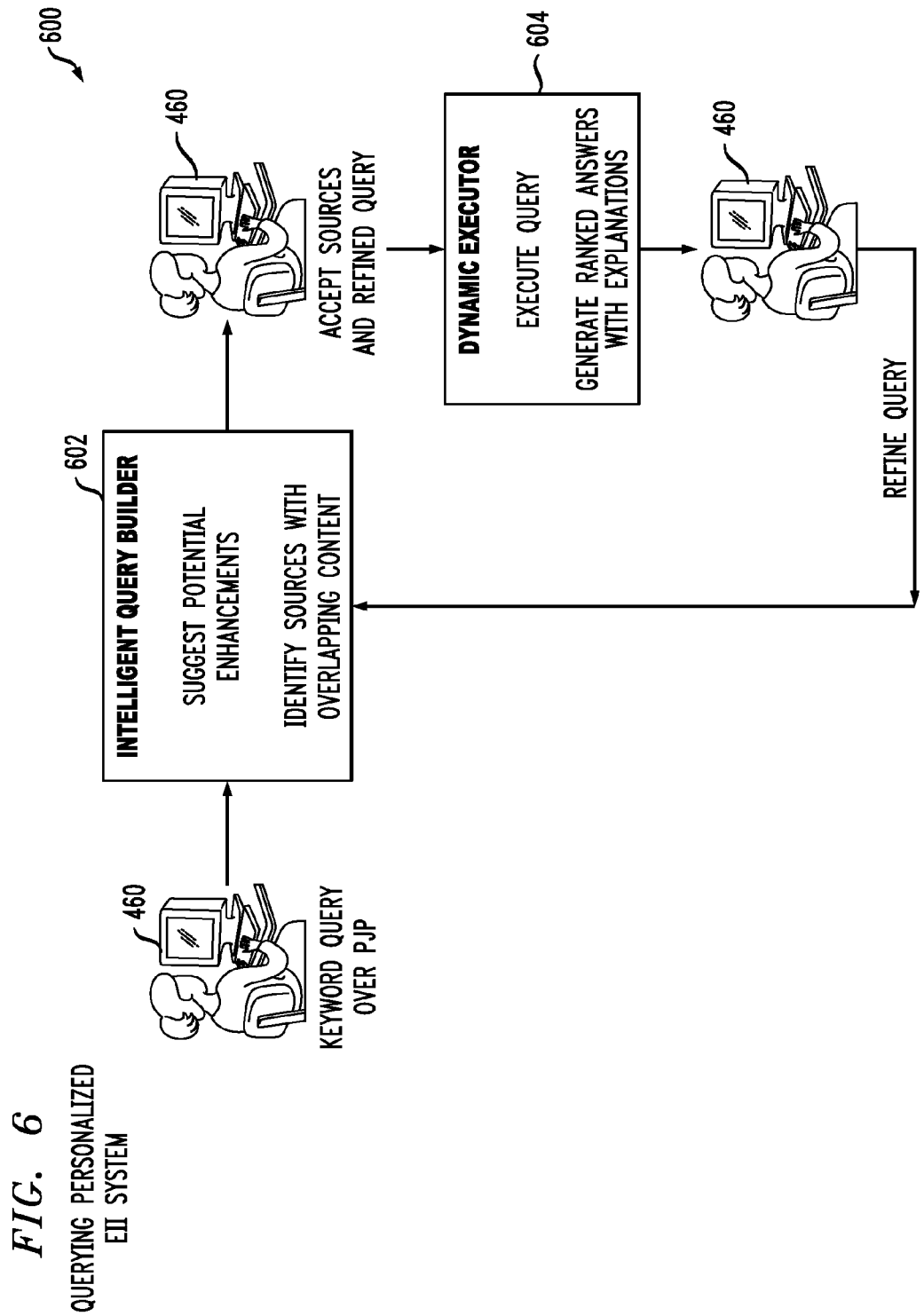
FIG. 6 is a flow chart showing exemplary querying of a personalized EII system, according to an aspect of the invention.

With attention now to flow chart 600 of FIG. 6, an example of executing queries over the personalized information integrator will now be set forth. The system allows user to execute an SQL and/or keyword query over the personalized integrator registered by the user. If new matching sources are found after registration then those will be shown to the user and user can opt to add them into the source querying pool for answering the queries. The system will automatically create a query plan for the new source identified for the integrator, as shown at step 602. Ranked answers with explanations can be provided by plugging in various ranking models, as shown at step 604.

One or more embodiments of the invention thus provide a framework for publishing source information (data and services) without knowledge of the complete global model, e.g., schema models. Further, one or more embodiments also provide an approach that accepts a "desired output" model and suggests an integration scheme, and techniques to recommend, to a user, mapping between a source schema and a user schema. An advantage of the on-the-fly integration over autonomous sources is the significant value-add for information integration tools.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
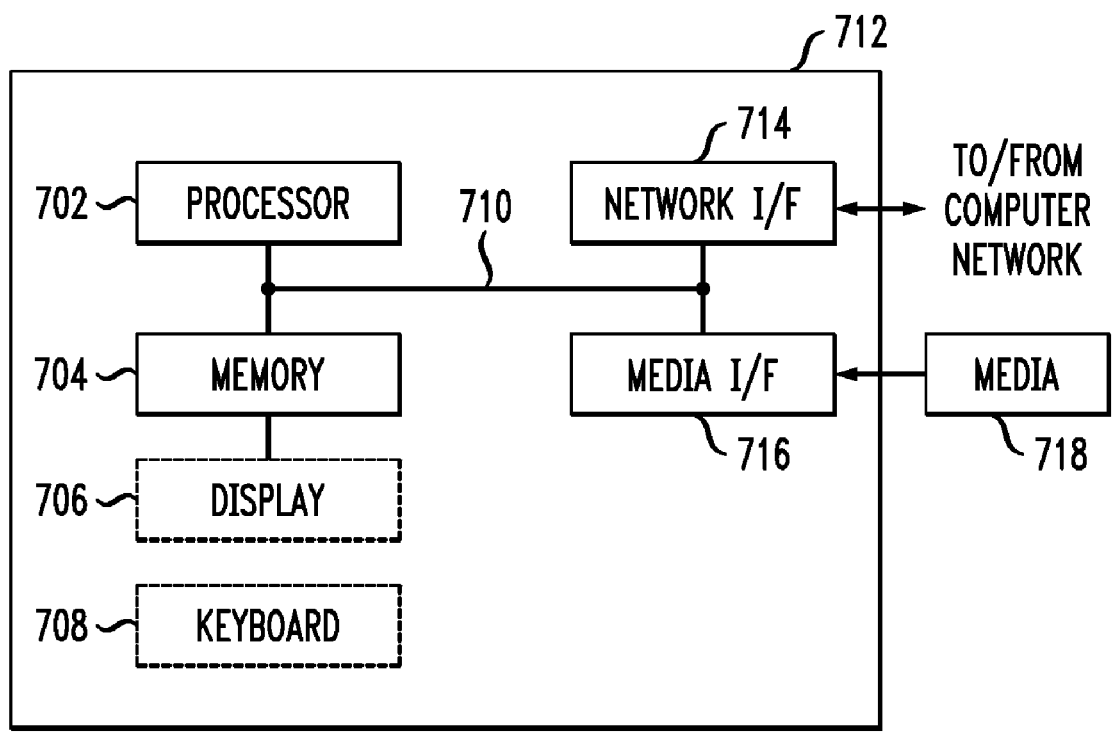
FIG. 7 depicts a computer system that may be useful in implementing one or more aspects and/or elements of the present invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The terra "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like, in addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 704), magnetic tape, a removable computer diskette (for example media 718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk; storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood mat the components illustrated herein may be implemented in various forms of hardware, software, or combinations thereof, for example, application specific integrated circuits) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for assembly of personalized enterprise information integrators over conjunctive queries, said apparatus comprising:
    a memory; and
    at least one processor, coupled to said memory, and operative to
        register a plurality of sources from one or more enterprise databases;
        construct a plurality of schemas based on said plurality of sources;
        obtain a desired output as a conjunctive query;
        automatically provide a list of potential connections between at least selected ones of said sources based on said conjunctive query;
        automatically develop a plurality of alternative join plans based on said connections, wherein each alternative join plan identifies a unique set of one or more joins between said at least selected ones of said sources; and
        automatically update the plurality of join plans as one or more additional sources are added to the one or more enterprise databases.

2. The apparatus of claim 1, wherein said processor is operative to register said plurality of sources via a user providing an access path to each of said plurality of sources, and wherein said processor is further operative to select an appropriate one of said schemas to publish each of said plurality of sources.

3. The apparatus of claim 2, wherein said processor is further operative to:
    enable said user contributing at least one new source during said registration step; and
    enhance attributes of said appropriate one of said schemas by providing metadata.

4. The apparatus of claim 3, wherein said metadata comprises at least one of an attribute type for at least one of said attributes and a sample instance.

5. A computer program product comprising a computer useable storage medium including computer usable program code for assembly of personalized enterprise information integrators over conjunctive queries, said computer program product including:
    computer usable program code for registering a plurality of sources from one or more enterprise databases;
    computer usable program code for constructing a plurality of schemas based on said plurality of sources;
    computer usable program code for obtaining a desired output as a conjunctive query;
    computer usable program code for automatically providing a list of potential connections between at least selected ones of said sources based on said conjunctive query;
    computer usable program code for automatically developing a plurality of alternative join plans based on said connections, wherein each alternative join plan identifies a unique set of one or more joins between said at least selected ones of said sources; and
    computer usable program code for automatically updating the plurality of join plans as one or more additional sources are added to the one or more enterprise databases.

6. The computer program product of claim 5, wherein said computer usable program code for registering said plurality of sources comprises computer usable program code for facilitating a user to provide an access path to each of said plurality of sources, further comprising computer usable program code for selecting an appropriate one of said schemas to publish each of said plurality of sources.

7. The computer program product of claim 6, further comprising computer usable program code for:
    said user contributing at least one new source during said registration step; and
    enhancing attributes of said appropriate one of said schemas by providing metadata.

8. The computer program product of claim 7, wherein said metadata comprises at least one of an attribute type for at least one of said attributes and a sample instance.

9. An apparatus for assembly of personalized enterprise information integrators over conjunctive queries, said apparatus comprising:
    a system, wherein said system comprises a memory, at least one hardware processor coupled to said memory, at least one network interface coupled to said at least one hardware processor, one or more distinct software modules loadable into said memory and executable on said at least one hardware processor;
    means for registering a plurality of sources from one or more enterprise databases, wherein said registration step is performed by one of said distinct software modules executing on said at least one hardware processor;
    means for constructing a plurality of schemas based on said plurality of sources, wherein said construction step is performed by one of said distinct software modules executing on said at least one hardware processor;
    means for obtaining a desired output as a conjunctive query, wherein said obtaining step is performed by one of said distinct software modules executing on said at least one hardware processor;
    means for automatically providing a list of potential connections between at least selected ones of said sources based on said conjunctive query, wherein said providing step is performed by one of said distinct software modules executing on said at least one hardware processor;
    means for automatically developing a plurality of alternative join plans based on said connections, wherein each alternative join plan identifies a unique set of one or more joins between said at least selected ones of said sources, wherein said developing step is performed by one of said distinct software modules executing on said at least one hardware processor; and means for automatically updating the plurality of join plans as one or more additional sources are added to the one or more enterprise databases, wherein said updating step is performed by one of said distinct software modules executing on said at least one hardware processor.

10. The apparatus of claim 9, wherein said means for registering said plurality of sources comprises means for facilitating a user to provide an access path to each of said plurality of sources, further comprising means for selecting an appropriate one of said schemas to publish each of said plurality of sources.

11. The apparatus of claim 10, further comprising:
means for said user contributing at least one new source during said registration step, wherein said contributing step is performed by one of said distinct software modules executing on said at least one hardware processor; and
means for enhancing attributes of said appropriate one of said schemas by providing metadata, wherein said enhancing step is performed by one of said distinct software modules executing on said at least one hardware processor.

12. An apparatus for assembly of a personalized enterprise information integrator, said apparatus comprising:
a memory; and
at least one processor, coupled to said memory, and operative to
register a plurality of sources from one or more enterprise databases;
construct a plurality of schemas based on said plurality of sources;
obtain a desired output as a conjunctive query;
automatically provide a list of potential connections between at least selected ones of said sources based on said conjunctive query;
enable filtering of the list of potential connections;
automatically develop a plurality of alternative join plans based on said connections, wherein each alternative join plan identifies a unique set of one or more joins between said at least selected ones of said sources; and
enable selection of a plan, wherein the selected plan is registered as a schema for a personalized information integrator.

* * * * *